United States Patent [19]
Dworak

[11] 4,147,902
[45] Apr. 3, 1979

[54] METHOD OF AUTOMATIC TRUNK TESTING

[75] Inventor: Francis S. Dworak, Oceanport, N.J.

[73] Assignee: Bell Telephone Laboratories, Incorporated, Murray Hill, N.J.

[21] Appl. No.: 794,371

[22] Filed: May 6, 1977

Related U.S. Application Data

[62] Division of Ser. No. 678,689, Apr. 20, 1976.

[51] Int. Cl.² ........................................... H04M 3/22
[52] U.S. Cl. ............................. 179/175.2 R; 179/7 R
[58] Field of Search ................. 179/175.2 C, 175.2 R, 179/175.3 R, 1 MN, 7 R, 7.1 R

[56] References Cited

U.S. PATENT DOCUMENTS

| | | | |
|---|---|---|---|
| 2,688,658 | 9/1954 | Carpenter | 179/7.1 |
| 2,848,543 | 8/1958 | Breed et al. | 179/7.1 |
| 3,188,401 | 6/1965 | Barret et al. | 179/175.2 R |
| 3,562,436 | 2/1971 | Lutgenau | 179/7.1 R |
| 3,651,269 | 3/1972 | Lestrat et al. | 179/7.1 R |
| 3,829,617 | 8/1974 | Caithamer et al. | 179/7.1 R |
| 3,829,627 | 8/1974 | Short et al. | 179/175.2 |
| 3,875,351 | 4/1975 | Kennedy | 179/175.3 R |
| 4,001,513 | 1/1977 | Naylor | 179/18 DA |

OTHER PUBLICATIONS

*Bell Lab Record* Jun. 1956, "CAMA–Automatic Trunk-Test Circuit" pp. 223–226 by Dusenberry.

*Primary Examiner*—Douglas W. Olms
*Attorney, Agent, or Firm*—Howard R. Popper

[57] ABSTRACT

A method of automatically detecting fraudulent telephone calls in telephone systems having a plurality of trunks served by automatic message accounting equipment. The trunks are normally scanned to detect changes in supervisory states for automatic message accounting purposes. When predetermined supervisory state sequences are detected at any one of the trunks, a special test control signal is generated and, responsive to the appearance of the special test control signal, the transmission path of the suspected trunk is seized to monitor whatever call signaling information may appear thereon during an interval when such signaling would not appear on a normal call to verify the existence of the fraudulent usage.

2 Claims, 4 Drawing Figures

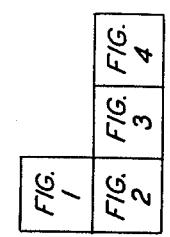
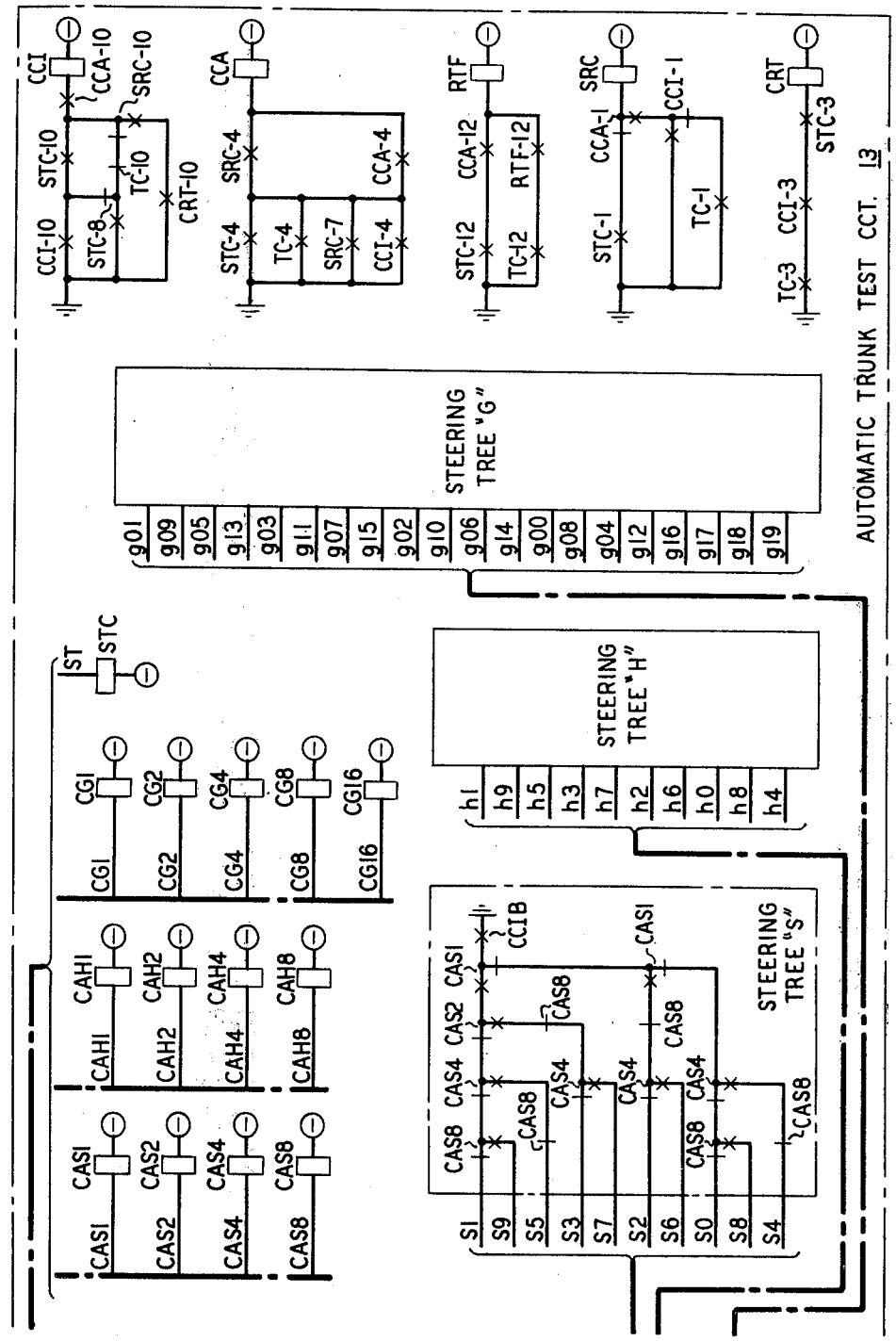

METHOD OF AUTOMATIC TRUNK TESTING

BACKGROUND OF THE INVENTION

This application is a divisional application of Francis. S. Dworak-Renald A. Ratti, Ser. No. 678,689, filed Apr. 20, 1976, entitled "Special Automatic Trunk Testing Arrangements."

This invention relates to service-observing methods and, more particularly, to an arrangement for automatically verifying the type of usage occurring on any trunk in a switching office without knowing in advance the trunk group within which such usage is likely to occur.

Service-observing equipment has long been available which could be wired to a group of lines or trunks that the telephone company believed would be likely to exhibit certain characteristics. For example, if a particular frame seemed to exhibit a high incidence of trouble conditions, the service-observing equipment could be wired to monitor the particular group of lines, trunks or registers associated with that frame. The service-observing equipment would be called into operation whenever one of the group of circuits appearing in the designated frame was seized for use.

It has also been possible, heretofore, to condition a call data recording system to match on the number of a predetermined line incident to the arrival of a call placed by that line at a tandem switching center. An example of an automatic message accounting (AMA) system having such service-observing equipment is found in FIGS. 120 through 132 of R. N. Breed et al. U.S. Pat. No. 2,848,543 issued Aug. 19, 1958 and described at columns 114–118 therein. In the performance of its principal operation, the Breed et al. patent system employs wholly electromechanical relay circuitry and punched paper tape recorders.

More recently, an improvement has been made to the call data recording system disclosed in the aforementioned Breed et al. patent according to which the punched paper tape recorders have been replaced by a minicomputer-controlled magnetic tape recording apparatus that employs scanners to monitor continuously the supervisory states of the calling and called sides of the trunks in the office. The sequence of signal states observed by the scanner, e.g., at the calling side sleeve lead and at a contact of the called side supervisory ("CS") relay, is forwarded to a minicomputer and therein analyzed in conjunction with the automatic message accounting information read by the scanner from the AMA recorder leads. Details of typical AMA recorder lead circuitry are disclosed in W. W. Carpenter U.S. Pat. No. 2,688,658 issued Sept. 7, 1954. From the combination of trunk state and AMA record lead information, the minicomputer is able to provide assembled recordings of call charge information so that customers may be properly billed for their calls.

In implementing the "computerized" version of the Breed et al. patent system, however, certain aspects of the service-observing problem remained to be solved. To definitely classify the actual usage being made of the transmission path, observation of the transmission path itself is required. Heretofore, actual connection to the transmission path has been severely limited because it is not desired to interfere with the privacy of customers' communications. Thus, while the computer of the aforementioned system is eminently well-suited to accept data from sleeve lead and relay contact scan points, and to compute the differences in times between signal states detected by the scanner, and to multiply the computed times by charge rates, the computer itself cannot verify the actual type of usage being made of the tip-and-ring conductors because it is not given access to these conductors.

In addition to the foregoing systems, automatic equipment has been available in the prior art for sequentially performing tests on the transmission paths of all of the trunks appearing in a switching office. In keeping with the policy of maintaining the privacy of customers' communications, such equipment has included busy/idle testing circuitry which functioned to preclude attachment of the test equipment to the tip-and-ring path if the trunk was found to be busy when it was reached in the sequence of test progression. (See for example, pp. 223-226 of the June 1956 issue of the *Bell Laboratories Record* containing an article entitled "CAMA — Automatic Trunk-Test Circuit" and col. 6, lines 34–38 and col. 11, lines 5-63 of Short et al. U.S. Pat. No. 3,829,627 issued Aug. 13, 1974.)

While the telephone companies wish to maintain the goal of keeping customers' conversations secure against unauthorized eavesdropping, the companies have noticed increased use of the switching network in recent years by unscrupulous persons. With the great reductions in the cost of electronic equipment, some persons have fabricated equipment to simulate switching control signals employed in the direct distance dialing network and have placed toll calls in such a manner as to defeat the automatic message accounting equipment. The result of such fraudulent use is to increase the costs to legitimate rate payers. Yet, it would not be feasible to have telephone company personnel monitor the tip-and-ring conductors of every telephone line, or even continuously to monitor the tip-and-ring conductors of lines suspected of having an inordinate number of unpaid toll calls. Accordingly, the need has been perceived for automatic apparatus which could monitor any of the trunks in a telephone office and directly ascertain the character of the transmission path usage.

SUMMARY OF THE INVENTION

I have discovered that the tip-and-ring transmission path signals may be automatically sampled without comprising the privacy of legitimate calls by employing the computerized CAMA system to operate with transmission path monitoring equipment. The prior art CAMA scanners are permitted to continue their normal scanning of trunk supervisory states. The program-controlled processor analyzes the trunk state signals delivered by the scanner, and when a predetermined sequence of timed signal differences on a particular trunk is observed, the processor signals the modified automatic trunk test circuitry. The latter, as disclosed and claimed in patent application Ser. No. 678,689, interrupts its routine testing of whatever idle trunk it had been testing, stores the identity of that trunk, disables its busy/idle test circuitry that normally precludes automatic trunk testing circuit from seizing a busy trunk, establishes a test connection to the trunk identified by the processor and connects automatically scanned signal detecting equipment to the tip-and-ring conductors of the suspect trunk, thereby to analyze the detected signals on the transmission path. At the conclusion of analyzing the transmission path sample, the busy/idle testing circuitry of the automatic trunk test circuit is restored, the identity of the trunk that was in the process of being tested is read and routine testing thereof is resumed if that trunk is still idle.

BRIEF DESCRIPTION OF THE DRAWINGS

The foregoing and other objects and features of my invention may become more apparent from the ensuing description when read together with the drawings in which:

FIG. 4 shows the circuitry for receiving the trunk designations from the signal distributor of FIG. 1; and FIG. 5 shows how FIGS. 1 through 4 are to be arranged.

GENERAL DESCRIPTION

Figure 1:
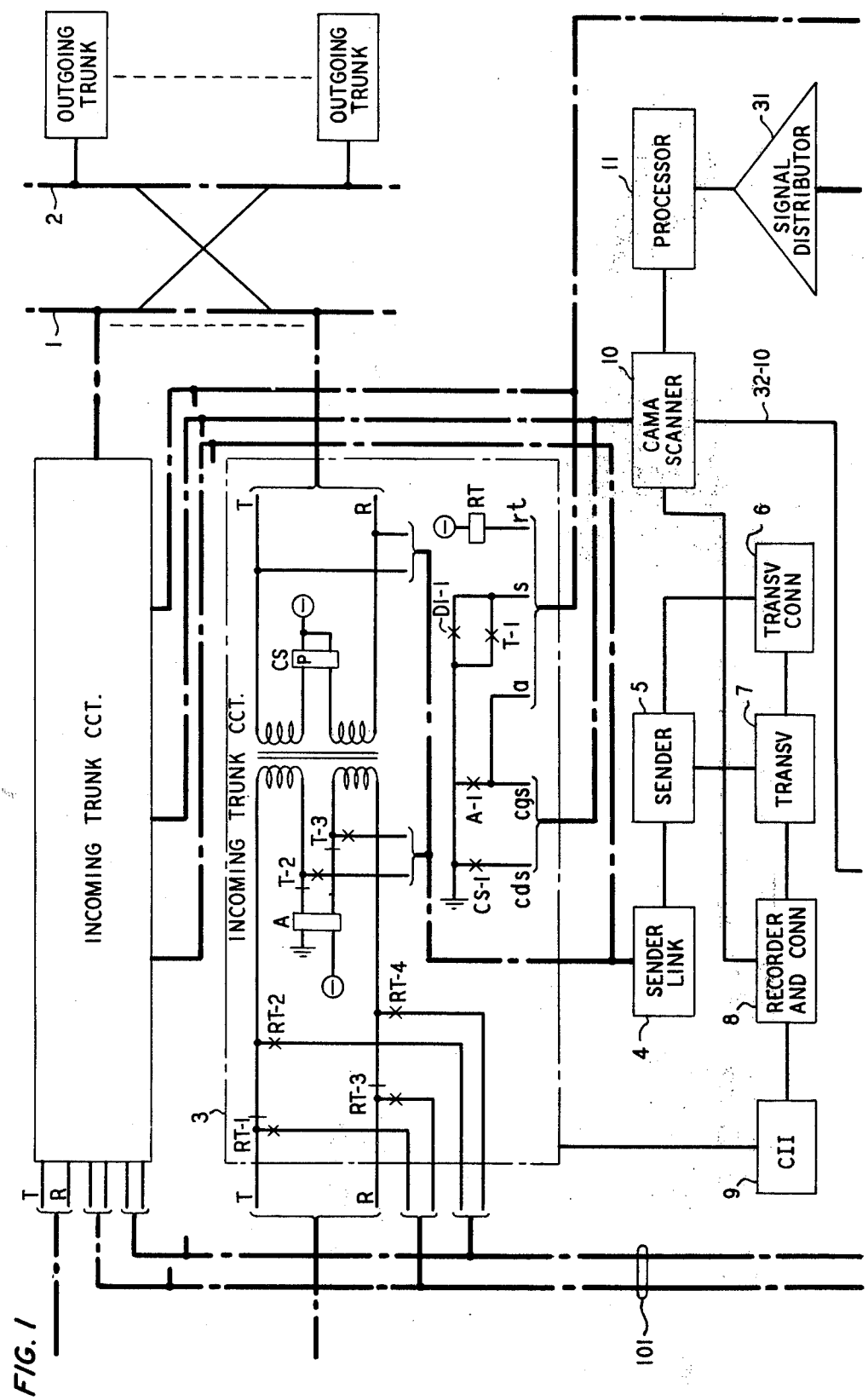
FIG. 1 shows the switching network, the trunk test multiple and the CAMA system of the prior art together with, and as modified by, the cooperating circuitry for practicing the method of my invention.

Inasmuch as the illustrative embodiment in which the method of the present invention may be practiced will be disclosed in association with a centralized automatic message accounting (CAMA) system and an automatic trunk testing system, it is appropriate to describe briefly the operations of the relevant portions of these prior art systems.

A switching office equipped for CAMA operation includes a plurality of switching frames 1, 2 (FIG. 1) in which the incoming trunks and outgoing trunks appear. An incoming trunk 3, when carrying a call that must be routed through the switching frames 1, 2, activates its appearance in sender link 4 and is connected to an idle sender 5. The sender 5 receives the called number. Near the end of the time during which the called number is being received, the sender 5 seizes transverter 7 via transverter connector 6; and when the sender has completed the reception of the called number digits it signals trunk 3 to request the calling office (not shown) to send forward the identity of the calling subscriber. The calling subscriber identity is then registered in sender 5 and transverter 7 seizes a billing indexer (not shown) in order to obtain the charging rate for the call. The billing indexer compares the originating point of the call with the destination and the rate treatment of the calling subscriber and then assigns one of twelve message billing index numbers to the call. Next, transverter 7 seizes recorder 8 serving the trunk group that includes trunk 3. During the recording process, sender 5 causes trunk 3 to identify itself to call identity indexer 9. The call identity indexer 9 recognizes the trunk requesting identity and furnishes a two-digit call identity index to recorder 8 for inclusion as part of the initial entry on punched paper tape. The initial entry on the AMA tape thus includes information about the calling and called subscriber and the identity of the trunk over which the call arrived at the CAMA office.

When all of the initial entry information is completed, transverter 7 permits sender 5 to commence outpulsing the information toward the destination office (not shown).

When the called subscriber answers, a second entry, called the answer entry, is made by recorder 8. This entry consists of a single line and contains the time at which the call was answered and the call identity index. When the call is terminated, a third entry, called the disconnect entry, is made by recorder 8. This entry is also a single line entry and contains the time at which the called party disconnected and, again, the call identity index.

To improve the operation of the CAMA system, a scanner 10 and stored program control processor 11 have recently been added in some installations. Scanner 10 scans trunk leads cgs and cds of each trunk 3, which leads report the calling and called side supervisory states. Scanner 10 thus delivers state information to processor 11 so that the latter may store, in its memory unit (not shown), a two-digit status number for each trunk that completely identifies the trunk state. A summary of the trunk states is contained in the following table:

TABLE 1

| Status of Trunk Leads of cqs, cds | Trunk State |
| --- | --- |
| 00 | Seize state |
| 01 | Connect state |
| 10 | Idle state |
| 11 | Trunk not wired or disconnect state in No. 4A toll trunks |

Scanner 10 receives from call identity indexer 9 the call identity index of the particular trunk, the status of whose cgs and cds leads it is in process of reporting to processor 11.

Figure 2:
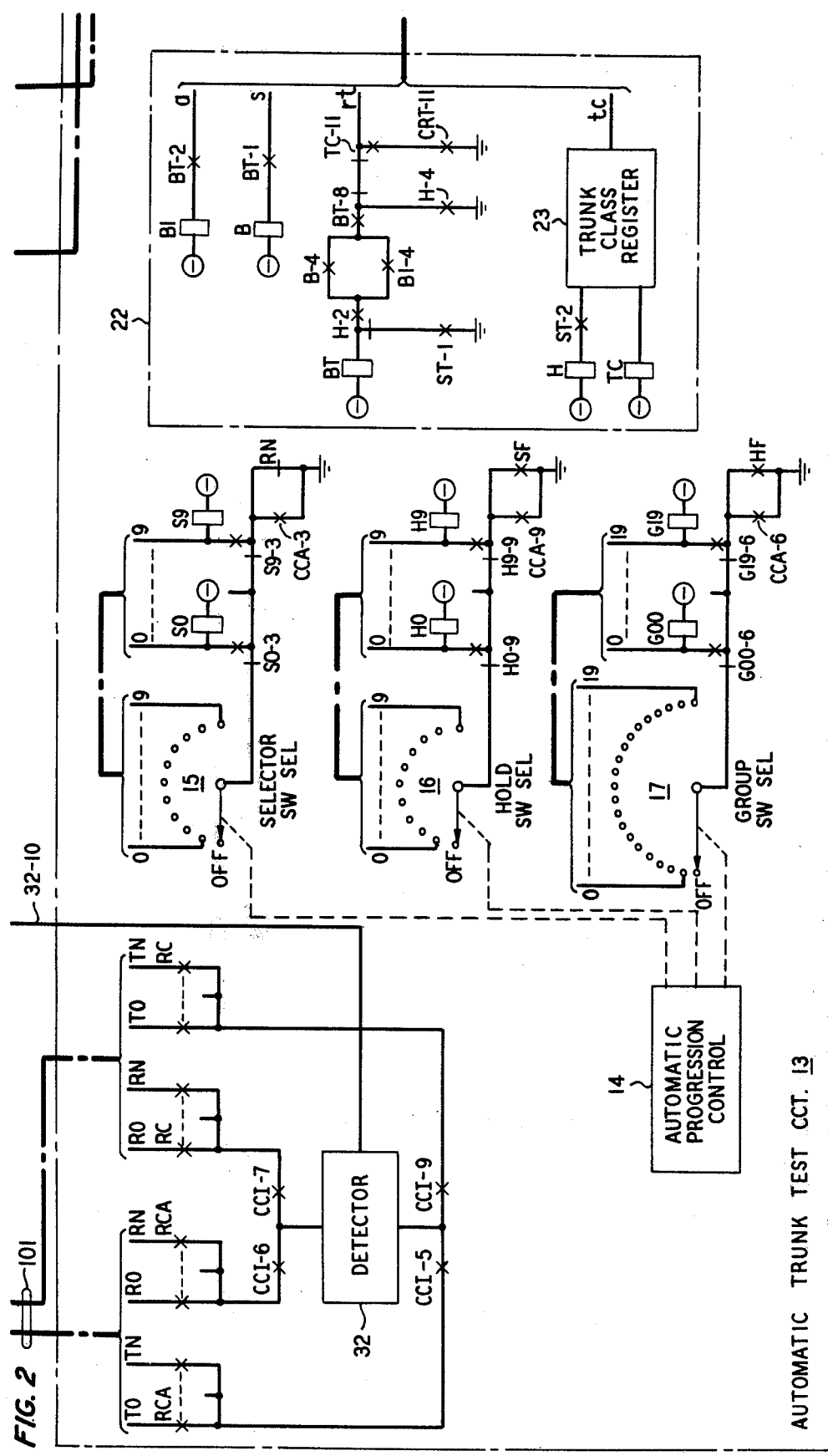
FIG. 2 shows the CAMA scanner, the transmission path monitoring circuit and the automatic progression control and busy test portions of the automatic trunk test circuit of the illustrative embodiment.
Figure 3:
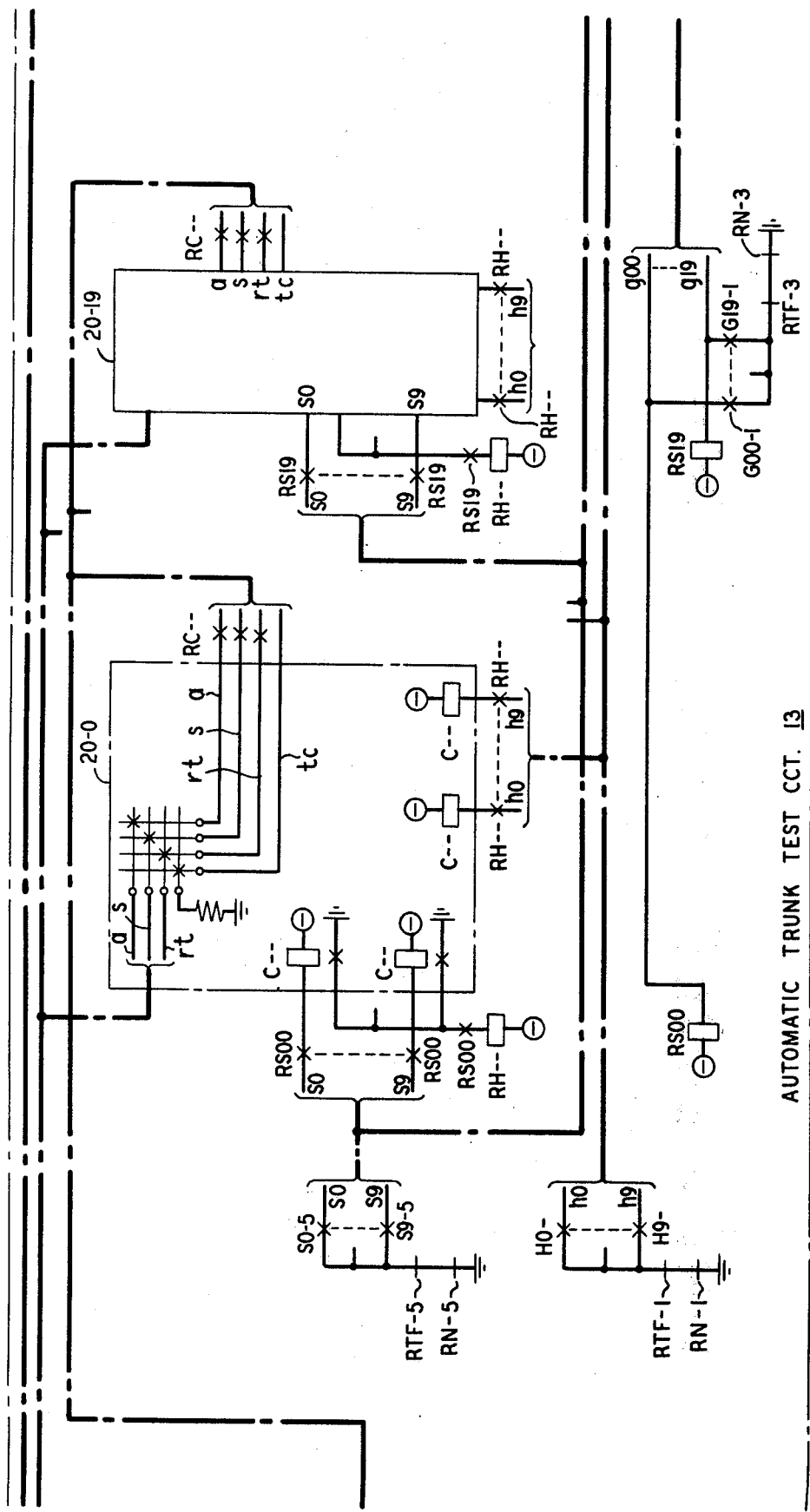
FIG. 3 shows the modifications to the crossbar selection switch circuitry of the automatic trunk test circuit.

The other major portion of the illustrative embodiment is the automatic trunk test circuit 13 (FIG. 2), only relevant portions of which are shown. In its normal prior art, operation trunk test circuit 13 routinely and sequentially performs a variety of tests upon each of the trunks appearing in frames 1, 2. Automatic trunk tester 13 obtains access to any of the 2,000 trunks in the CAMA office by first employing one of 20 crossbar switches 20-0 through 20-19 (FIG. 3), each of which may be operated to select one of 100 trunks by ascertaining that the accessed trunk is idle and by thereafter seizing test multiple 110 to conduct transmission path tests. Each group of 100 trunks is associated with a respective call identity indexer, such as call identity indexer 9, associated with the first group of one hundred trunks which includes the single trunk circuit 3 shown in detail in the drawing. Trunks are thus assigned to the crosspoints in crossbar switches 20-0 through 20-19 in a set pattern with the call identity indexer of the trunk determining the location. The number of the vertical of the crossbar switch corresponds to the tens digit of a call identity index and the number of the horizontal level corresponds to the units digit of the call identity index.

The first trunk to be selected for test under automatic progression is determined by automatic progression control 14 (FIG. 2) presetting the group tens and units selector switch 17, the hold magnet selector switch 16 and the select magnet selector switch 15. Selector switches 15, 16 and 17 complete an operating path to one relay in each of three chains: one relay in relay chain S0 through S9 which designates one of the select magnets as determined by the call identity index units digit; one relay in relay chain H0 through H9 which designates one of the vertical magnets as determined by the call identity index tens digit; and one relay in relay chain G00 through G19 which designates one of multicontact relays RS00 through RS19. The operated one of relays RS00 through RS19 determines which one of the 20 crossbar switches 20-0 through 20-19, respectively, shall receive the operating ground forwarded over the contacts of relays S0 through S9. Automatic progression from one trunk to the next is obtained by automatic progression control 14 advancing the G—relay chain one step at a time. The H—chain is advanced one step each time the G—chain recycles, and the S—chain is advanced one step each time the H—chain recycles. The operated S— and H—relays control the crossbar switch magnets C— in the one of crossbar switches 20-0 through 20-19 selected by the operation of the G— and RS—relays. The operated crosspoint extends a path that includes the a, rt and s leads from the trunk and class lead tc from the crossbar switch to circuit 22 of trunk test circuit 13. A number of other circuit paths are also connected through the crosspoint, but these paths, not being essential to the understanding of our invention, are not described.

Incident to, or somewhat before, the time that switches 15, 16 and 17 are initially set by circuit 14 to designate a particular trunk to be seized, start relay contact ST-1 (winding not shown) will have been operated to complete a ground operating path to busy test relay BT that is made available over the back contact of transfer contacts H-2. Relay BT operated at its make contacts BT-1 and BT-2 extends the continuity of leads s, a and tc to the windings of relays B and B1 and to the trunk class registration circuit 23. Relay B will be operated by the ground which is applied by trunk 3 to lead s if trunk 3 is in the seized state.

Trunk 3 (FIG. 1) includes several relays whose operation is well known including the D1 and T relays (winding not shown). The D1 relay will be operated when sender 5 is connected to the trunk over sender link 4, and the T relay will operate to transfer the calling side tip-and-ring leads of the trunk to the sender so that the sender may monitor calling side supervision of the trunk. To simplify the drawing, only contacts T-1, T-2 and T-3 of relay T are shown and only contact D1-1 of the D1 relay is shown. If trunk 3 is seized at its calling side, the operated trunk relay A will apply ground at its contact A-1 to lead a to operate relay B1 in circuit 22.

At the same time, trunk class registration circuit 23 will respond to the type of resistance ground supplied by the operated crosspoint to register the type of trunk selected as to whether it is a multifrequency, dial pulse or panel call-indicating class trunk. Relay H will be operated by circuit 23 over a path made available by operated make contact ST-2. The operation of relay H at its transfer contacts H-2 transfers the winding of relay BT from start contacts ST-1 to a path comprising the parallel combination of make contacts B-4 and B1-4. Relay BT will be maintained operated after the registration of the trunk class information if either or both of relays B and B1 have been operated from the grounds supplied by a busy trunk. If neither relay B nor relay B1 is operated, the trunk is idle and relay BT will shortly release. Upon the release of relay BT, a path is provided over its released back contact BT-8 and still operated contact H-4 to apply ground to lead rt.

The ground on lead rt will operate relay RT in trunk 3, and the transfer contacts RT-1, RT-3 and make contacts RT-2 and RT-4 of relay RT will transfer the tip-and-ring leads of trunk 3 to test multiple 101 and circuitry (not shown) in trunk test circuit 13 (FIG. 2) for the performance of a variety of tests thereon. A general description of the types of tests so performed is contained in *Bell Laboratories Record* of June 1956, pages 223–226, article entitled "CAMA — Automatic Trunk-Test Circuit" by R. N. Dusenberry.

It should be noted that, in accordance with the prior art operation of the components of trunk test circuit 13 which have thus far been described, circuit 13 is precluded from transferring the tip-and-ring conductors of trunk 3 in the event that either or both of busy test relays B and B1 are operated as occasioned by the calling or called side of the trunk being in the busy condition. It is also to be noted that the H relay ground applied by the prior art circuitry to lead rt is not applied unless the automatic progression control circuit 14 is controlling selector switches 15, 16, 17, and the start relay ST has been operated for the performance of the routine series of progression tests.

In accordance with the illustrative embodiment, not only will the tip-and-ring leads of a busy trunk be transferred via the test multiple 101 to special signal detector circuitry newly added to trunk test circuit 13, but the transfer will be made immediately in the event that circuit 13 was itself idle (relay contact ST-2 released). Moreover, if circuit 13 had been in process of making a routine test of a trunk (relay contact ST-2 operated), that test would be interrupted, the operated ones of relay S0 through S9, H0 through H9 and G00 through G19 designating the trunk under test would be locked but the corresponding C—magnets of the particular one of crossbar switch 20-0 through 20-19 would be released. Then different ones of these C—magnets would be operated to cause one of the crossbar switches 20-0 through 20-19 to seize the busy trunk. The manner in which these operations occur will now be described.

CAMA scanner 10, in addition to scanning leads cgs and cds to detect the supervisory state of the calling and called sides of the trunks for the purpose of ascertaining the answer and disconnect times so that calling customers can be charged for the call, also reports to processor 11 the instantaneous supervisory states of all busy trunks. Processor 11, by means of a simple subtraction routine, will compute the time differences between the occurrences of the various trunk supervisory states (indicated in Table 1 above). For a trunk exhibiting predetermined time differences in its supervisory states, processor 11 will furnish signal distributor 31 the call identity index of the trunk (hereinafter designated the "suspect" trunk) and will operate relay STC (FIG. 4).

Relay STC operated at its contact STC-1 operates relay SRC. Relay SRC at its contact SRC-4 completes a path prepared by the operation of contact STC-4 to operate relay CCA. Relay CCA will thus remain operated should relay SRC release. Relay CCA at its operated make contacts CCA-3 (FIG. 2) locks the priorly operated one of relays S0-9 that identified the select level of the idle trunk that was under routine test when processor 11 determined that the suspect trunk should be checked. At its operated contact CCA-9, relay CCA locks the one of relays H0-H9 that identified the vertical file of the idle trunk under test and at its contact CCA-6 locks the operated one of relays G00-G19 that identified the group in which the idle trunk under routine test was located. Relays STC and CCA operated at their make contacts STC-12 and CCA-12 complete an operating path for relay RTF. Relay RTF, at its operated back contacts RTF-1, -3, and -5 (FIG. 3), opens the operating ground for relays RS— and magnets C— associated with the one of crossbar switches 20-0 through 20-19 that had been operated to select the trunk under routine test. Relays CAS1, 2, 4, 8 (FIG. 4) will be operated in accordance with the units digit of the call identity index. Relays CAH1, 2, 4, 8 will be operated in accordance with the tens digits of the call identity index, and relays CG1, 2, 4, 8, 16 will be operated in accordance with the group of one hundred trunks associated with the particular one of call identity indexers 9 serving the suspect trunk in question. In addition, signal distributor 31 will operate relay STC to commence the ensuing sequence of operations. The steering tree circuitry provides alternate operating grounds to leads s0–s9, h0–h9, and g00–g19.

Accordingly, a new one of crossbar switches 20-0 through 20-19 (FIG. 3) will be operated to select the suspect trunk identified by the call identity index supplied by processor 11 via signal distributor 31. The rt, s and a leads of the trunk will be cut through to test circuit 22 by the operated crossbar switch. However, the relay BT will not be operated, and accordingly, busy test relays B and B1 cannot be operated. Thus, the busy or idle state of the suspect trunk is ignored and does not prevent the operation of relay RT in the trunk.

Relay CCA operated, as previously described, will, at its transfer contacts CCA-1, transfer the operating path for relay SRC to transfer contacts CCI-1. Relay CCI has not yet been operated. At this time, relay SRC will therefore momentarily release until relay CCI or relay TC operates. Relay CCI prepares a path for trunk transmission through the test frame with detector 32 bridged to the path. Relay TC prevents seizure of certain classes of trunks and confirms that a new path has been established to a trunk. Relay CRT cannot operate until both relays CCI and TC are operated. When relay CRT operates, lead rt is seized to transfer the trunk transmission path through the test frame. During the momentary release of relay SRC, a path is completed from ground over the make contact of transfer contact STC-8, back contact TC-10, back contacts of transfer contact SRC-10 and make contact CCA-10 to the winding of relay CCI. Relay CCI then operates and prepares, at the make contact of its transfer contact CCI-1, a new operating path for relay SRC, which is completed over the make contact of transfer contact CCA-1. Relay SRC is now operated. With relay SRC operated, the holding path for relay CCI now extends from ground contact CRT 10, make contact of transfer contact SRC-10 and make contact CCA-10 to the winding of relay CCI. When relay TC operates (as it will when the trunk class is supplied by the operated one of crossbar switches 20-0 through 20-19), a path is completed that may be traced from ground, make contact TC-3, make contact CCI-3, and make contact STC-3 to operate relay CRT. Relay CRT, in turn, operates trunk relay RT to extend the transmission path through the test frame.

When relay CCI operates as described above, detector 32 (FIG. 2) is connected across the tip-and-ring conductors that have been extended to circuit 13 by the operation of relay RT in the trunk (FIG. 1). When relay CRT operates trunk relay RT, detector 32 detects whatever call signaling or other audio tones are impressed across the tip-and-ring conductors of the trunk by the calling party. Scanner 10 scans detector 32 over lead 32-10 and reports the information to processor 11 which is provided with suitable programs to analyze the detected signal. When a suitable sample has been analyzed by processor 11, it commands signal distributor 31 to release relay STC. Relay STC released at its release make contact STC-3 releases relay CRT thereby releasing relay RT in the incoming trunk. Relay CRT released at its released make contact CRT-10 releases relay CCI.

At or about the same time that processor 11 instructs signal distributor 31 to release relay STC, the operated ones of relays CAS—, CAH—, and CG— are also released thereby removing the operating path to the crossbar switch magnets C— in the operated one of crossbar switches 20-0 through 20-19. With the release of the operated crossbar switch, trunk class information is removed from lead tc and relay TC releases. With the release of relay TC, relays RTF and SRC release, and the latter in turn releases relay CCA.

The release of relay RTF, at its released back contacts RTF-5, RTF-3 and RTF-1, restores the previously-described prior art circuitry of circuit 13, including that utilizing the ground made available at the back contacts of relay RN-3, RN-5 and RN-1. One of crossbar switches 20-0 through 20-19 will again be reoperated in accordance with the S—, H—, and G—relays that were locked just prior to the release of contacts CCA-3, -9 and -6. Relays B and B1 will again test leads s and a to ascertain the busy/idle state of the trunk. If the trunk that was under test before the interruption by distributor 31 is still idle, the routine test will be resumed. On the other hand, if the trunk in the meantime has become busy, relays B and B1 will block the routine test and, by means of prior art circuitry (not shown), automatic progression control 14 will advance to the next trunk in the sequence of routine test.

Accordingly, an illustrative embodiment has been described in which the method of my invention may be practiced employing two prior art subsystems, namely, the CAMA charge recording system and the routine trunk circuit testing system, the operations of which have been combined so that a transmission path monitoring can be performed upon busy trunks on a selective and yet automatic basis. The status of the tip-and-ring conductors may thus be analyzed under computer control without manual intervention or the need to compromise the privacy of the customer's conversation to telephone company employees. Further and other modifications of my method may be devised by those skilled in the art without departing from the spirit and scope of my invention.

What is claimed is:

1. For use with a telephone switching system having a plurality of trunks and automatic message accounting equipment including means for normally scanning busy ones of said trunks to obtain a supervisory state information for call charging purposes, the method of detecting a fraudulent telephone call comprising the steps of:
   detecting, at said scanning means, the appearance of predetermined supervisory state sequences at any one of said plurality of trunks, and
   responsive to said detecting, generating a special test control signal to indicate the likelihood of the presence of a fraudulent call on said trunk.

2. For use with a telephone switching system having a plurality of trunks and automatic message accounting equipment including means for normally scanning busy ones of said trunks to obtain supervisory state information for call charging purposes, the method of detecting a fraudulent telephone call comprising the step of detecting at said scanning means the occurrence of predetermined supervisory state sequences at any of said plurality of trunks and of generating a special test control signal when said state sequences occur within a predetermined time interval.

* * * * *